United States Patent [19]
Weist

[11] Patent Number: 5,615,987
[45] Date of Patent: Apr. 1, 1997

[54] WORM CONVEYOR FOR BULK MATERIAL

[75] Inventor: Hans-Joachim Weist, Münsterdorf, Germany

[73] Assignee: Claudius Peters Aktiengesellschaft, Buxtehude, Germany

[21] Appl. No.: 318,273

[22] Filed: Oct. 5, 1994

[30] Foreign Application Priority Data

Oct. 6, 1993 [DE] Germany ............ 93 15 175.6

[51] Int. Cl.⁶ .................................................. B65G 53/08
[52] U.S. Cl. .................. 414/218; 406/60; 137/514
[58] Field of Search ............................ 414/218; 406/60, 406/53, 56; 366/192; 137/514

[56] References Cited

U.S. PATENT DOCUMENTS 2,184,248  12/1939  Bonotto .................................. 406/60
2,355,774  8/1944   Baker ..................................... 406/60
3,600,041  8/1971   Hirano et al. ......................... 406/60
4,763,754  8/1988   Coppolani et al. ................... 181/237

FOREIGN PATENT DOCUMENTS 0237456  9/1987   European Pat. Off. .
755192   11/1933  France .
886268   8/1953   Germany .

Primary Examiner—Thomas J. Brahan
Attorney, Agent, or Firm—Chilton, Alix & Van Kirk

[57] ABSTRACT

Worm conveyor for bulk material, the outlet of which is separated from an outlet chamber, in which a higher gas pressure obtains than at the inlet of the worm conveyor, by a non-return flap, which is pressed by a flexible force into the closed setting. The operating behaviour of the conveyor is improved, in particular drive power and wear are reduced, in that a damper is provided for damping the movement of the non-return flap, in particular for damping the opening movement.

4 Claims, 1 Drawing Sheet

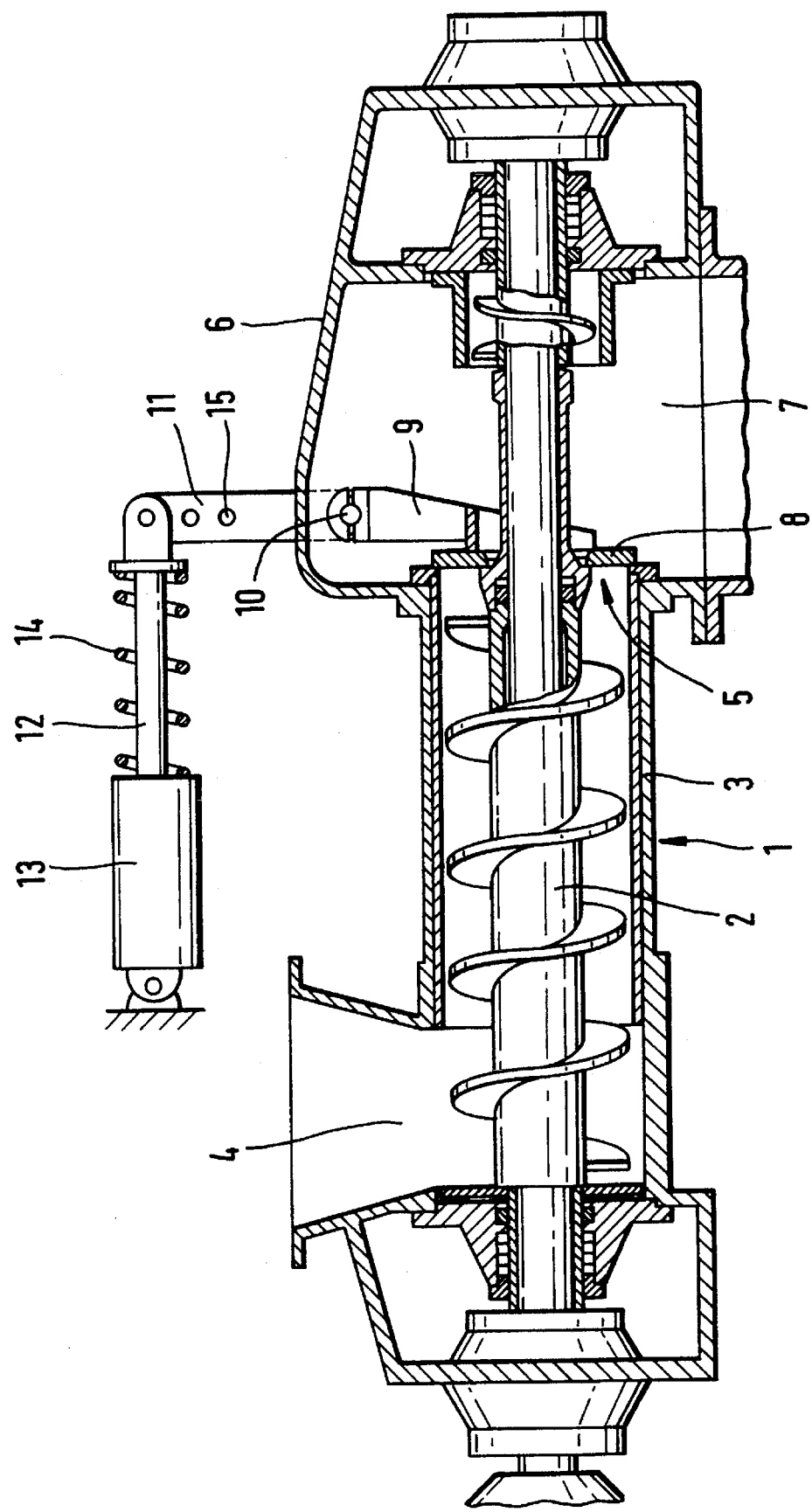

WORM CONVEYOR FOR BULK MATERIAL

BACKGROUND OF THE INVENTION

In worm conveyors for bulk material, which are designed to convey into a higher-pressure outlet chamber, it is known (EP-B 98 340, FR-A 755 192, DE-C 886 268) to provide at the outlet end of the worm conveyor a non-return flap. The non-return flap is pressed by weight, spring force or pneumatically into the closed setting. Without a non-return flap, the pressure differential between the outlet and the inlet of the worm conveyor would result in a gas flow in the worm conveyor counter to its direction of conveyance. The counter directional gas flow would render the reception of bulk material at the inlet end impossible. As soon as the worm conveyor is filled with bulk material which is suitable for plugging, the counter-directional gas flow can be sufficiently suppressed insofar as, at the inlet of the worm conveyor, a sufficient supply of new bulk material is guaranteed. Since this condition cannot however always be met and since there are also bulk materials which, due to their coarseness, grain spectrum or consistency, exhibit little tendency to plug, the flap function is generally necessary during operation also. The material leaving the conveyor raises the flap from its seat, whereupon the flap, due to being flexibly stressed by spring or weight, continues to exert a compressive and cohesive effect upon the material located in the outlet end of the conveyor and thereby contributes to the formation of a plug. This effect is all the more pronounced, the stronger the force by which the flap is forced into the closed setting. In the case of so-called "difficult" material, which exhibits little tendency to plug and in which there is a danger of counter-directional gas flow, there is not only impairment of the conveying effect but also possibly the reception of the material is inhibited. The flap-closing force is therefore set at a high level. This has the drawback, however, that the material encounters a high discharge resistance. A higher drive power is necessary for the conveyor worm, wear increases and the temperature of the conveyor material is possibly inadmissibly raised.

In the known machines, a brisk movement of the non-return flap is evident during operation. It was assumed that this was a necessary concomitant of the regular flap function, because it seemed necessary for the flap to be able to adapt itself without delay to the varying conditions of the material discharge at the worm outlet. The rapid response was required in order, on the one hand, to prevent the discharge of material from being unnecessarily inhibited and, on the other hand, to enable a sufficient retention effect to be exerted at all times upon the material being discharged.

SUMMARY OF THE INVENTION

In contrast to this assumption, it has been found, by virtue of the present invention, that operating behavior is improved if a damper is provided for damping the movement of the non-return flaps. This is surprising, because the effect of any damping is that the flap can only follow the material movement in a delayed fashion. It has been shown, however, that the closing force of the flap can be drastically reduced even in the case of difficult material. The result of this is that the drive power, the wear and the temperature increase in the material also turn out to be substantially less. A given worm conveyor can be operated at lower minimum rotational speed and correspondingly lower minimum output than previously, without counter directional gas obstructing the reception of material at the inlet end. It can also be operated at higher maximum rotational speed and maximum output. The range of capacity is thereby considerably expanded. The conveyance is also more uniform than previously, which is advantageous, in turn, in terms of any subsequent pneumatic conveyance and in those instances in which metering is to take place.

It has not yet been possible to adequately detail the associations upon which the effect of the invention is based. The following associations could however be critical. If, in conventional worm conveyors, a comparison is made between, on the one hand, the restoring force which is exerted by spring or weight and, on the other hand, the force exerted upon the flap, in the direction of closing, by the differential pressure, then it is found that the latter is many times greater than the former. The force exerted by the differential pressure is, however, only fully effective when the flap bears, over its entire extent, upon the seat or material plug. As soon as, at one point, there is no satisfactory contact present or coarse-grained material leaves an interspace, then the gas pressure of the outlet chamber acts also upon that side of the flap facing the worm. This reduces the closing force exerted upon the flap by the gas pressure or totally eliminates it, so that only the restoring force of the spring or of the weight is still in force. According to the momentary state of the material being discharged, the force exerted by the flap upon the material and the compression thus produced strongly varies, thereby resulting in a corresponding mutual reaction. The damping according to the invention reduces this mutual reaction and therefore produces a better result.

Expediently, the damping acts solely or predominantly counter to the direction of opening of the flap.

In a given worm conveyor, for example, in the conveyance of fly ash, which is regarded as difficult material, the restoring force exerted upon the flap by the spring force was able to be reduced to approximately one-tenth and the output, under equal drive power, was able to be increased by one-third.

The invention is of particular value in so-called "screw pumps", which supply bulk material to a pneumatic conveyor, an overpressure of 0.5 to 2 bar obtaining in the outlet chamber of the worm conveyor.

The invention is explained in greater detail below with reference to the drawing, which illustrates an advantageous illustrative embodiment.

BRIEF DESCRIPTION OF THE DRAWING

The sole FIGURE is a longitudinal sectional view of a worm conveyor incorporating the damper of the present invention.

DESCRIPTION OF THE PREFERRED EMBODIMENT

The worm conveyor 1 possesses a housing 3, encircling the worm 2, and having an inlet funnel 4 and outlet opening 5. Since the worm, in the represented example, is mounted at both ends, the outlet opening 5 is annular. The worm can also, however, be overhung and the outlet opening is correspondingly fully circular. The outlet chamber 7 covers the discharge end of the opening 5 and is enclosed by a housing 6 that leads to a pneumatic conveying line (not shown). The line is pressurized by the over-atmospheric pressure of the conveyor gas in the order of magnitude of 0.5 to 2 bar, whilst the inlet 4 of the worm conveyor lies approximately at atmospheric pressure.

The outlet opening 5 is provided with a non-return flap 8, which can be pivoted by an arm 9 about an axle 10. The axle 10 is connected to a further lever arm 11, the free end of which is connected to and acted upon by the piston rod 12 of a damping cylinder 13. In addition, this lever end 11 is acted upon by a pressure spring 14, which determines the restoring force for the flap 8. The size of the restoring force is adjustable, for example by virtue of the end of the piston rod 12 being connectable to different bores 15 in the lever arm 11. The damping of the damping cylinder 13 acts only in one direction, namely counter to the opening movement of the flap. It should likewise be adjustable, preferably in an infinitely variable manner.

I claim:

1. In a worm conveyor for bulk material having an outlet port, a discharge chamber adjacent said outlet port for receiving said material passing through said port, a non-return flap closably covering said port and movable away from and toward a closed position for controlling flow of material through said port toward said chamber and reverse flow from said chamber through said port, and spring means operatively associated with said flap for constantly urging said flap toward its closed position, the improvement comprising damping means operatively acting on said flap for damping movement of said flap away from its closed position against the bias of said spring means wherein said damping means comprises a damping cylinder.

2. The worm conveyor of claim 1 wherein the closing force of said spring means is adjustable.

3. In a worm conveyor for bulk material having an outlet port, a discharge chamber adjacent said outlet port for receiving said material passing through said port, a non-return flap closably covering said port and movable away from and toward a closed position for controlling flow of material through said port toward said chamber and reverse flow from said chamber through said port, and spring means operatively associated with said flap for constantly urging said flap toward its closed position, the improvement comprising damping means operatively acting on said flap for damping movement of said flap away from its closed position against the bias of said spring means and a pivot linkage operatively connecting said flap to both said spring means and said damping means for pivotal movement upon movement of said flap toward and away from said closed position, said damping means being effective for regulating movement of said flap away from said closed position.

4. The worm conveyor of claim 1 wherein said damping means is adjustable.

* * * * *